Patented Apr. 9, 1940

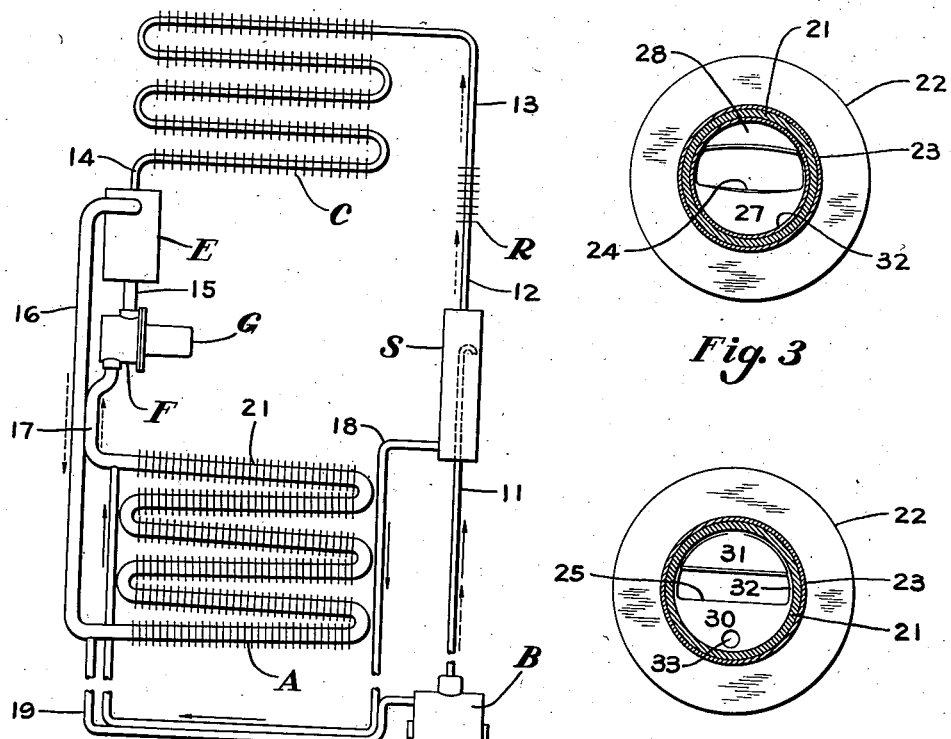
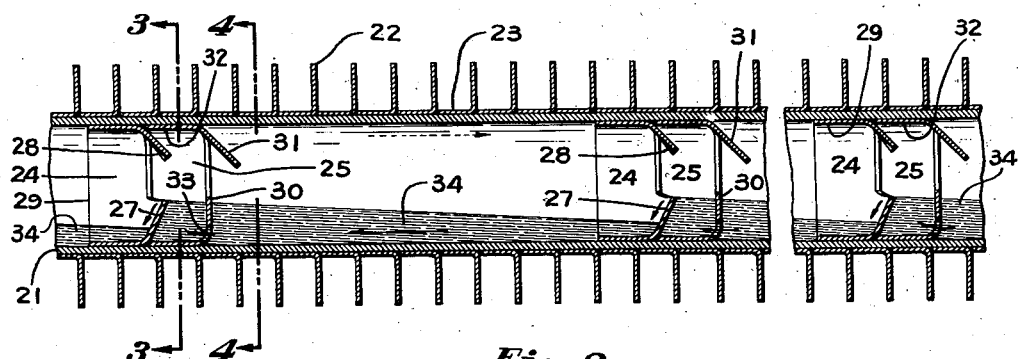

2,196,771

UNITED STATES PATENT OFFICE 2,196,771

ABSORBER FOR REFRIGERATING SYSTEMS

William H. Kitto, Canton, Ohio, assignor to The Hoover Company, North Canton, Ohio, a corporation of Ohio Application June 24, 1937, Serial No. 150,151

10 Claims. (Cl. 261—11)

This invention relates to continuous absorption refrigerating systems and more particularly to absorbers adapted for use therein.

It is an object of this invention to agitate the gases in a refrigeration absorber in such fashion that efficient heat transfer takes place between the said gases and the medium surrounding the absorber vessel.

It is a further object of the invention to cause the gases and liquids contained in a refrigerator absorber to follow paths and motions such that efficient absorption takes place.

It is a further object of the invention to provide an absorber for a refrigeration system of such character that stagnation of portions of the absorption liquid is effectively prevented.

It is a further object of the invention to provide an absorber for refrigeration systems which is efficient in operation and easy to manufacture.

Other objects and advantages reside in certain novel features of the arrangement and construction of parts as will be apparent from the following description taken in connection with the accompanying drawing in which:

Figure 1 is a diagrammatic representation of a continuous absorption refrigerating system having an absorber constructed in accordance with the present invention incorporated therein.

Figure 2 is a longitudinal cross-sectional view on an enlarged scale of the absorber shown in Figure 1.

Figure 3 is a view taken along the line 3—3 of Figure 2 looking in the direction of the arrows.

Figure 4 is a sectional view taken along the line 4—4 of Figure 2 looking in the direction of the arrows.

Referring to the drawing in detail and first to Figure 1 thereof it will be apparent that a continuous absorption refrigerating system is illustrated as comprising a boiler B, a vapor separation chamber S, a rectifier R, a condenser C, an evaporator E, and an inclined tubular air cooled absorber A, and an inert gas circulating fan F driven by a motor G.

The elements of the refrigeration system just described are connected by various conduits to form a continuous absorption refrigerating system. A vapor lift conduit 11 connects the boiler B to the vapor separation chamber S.

The refrigerant circuit comprises a conduit 12 connecting the vapor separation chamber S to the rectifier R wherein entrained water vapor is condensed out of the refrigerant vapor and returned through conduit 12 to the separation chamber S. From the rectifier R a conduit 13 conveys the vaporous refrigerant to the condenser C wherein it is liquefied by atmospheric cooling. The liquid refrigerant is discharged into the evaporator E through the conduit 14.

The inert gas circuit comprises a conduit 15 connecting the discharge side of the fan F with the evaporator E. Gas discharged through the conduit 15 into the evaporator E picks up ammonia vapor boiled off the liquid discharged from the conduit 14 and the vapor-gas mixture is discharged from the evaporator E through the conduit 16 into the lower portion of the absorber A. In the absorber A the vapor gas mixture discharged from the conduit 16 passes in counterflow relation to absorption liquid whereby the vapor is stripped from the inert gas and the pure inert gas is returned to the fan F by way of conduit 17 which is in heat exchange relation with conduit 16.

Weak absorption liquid is discharged into the separation chamber S by vapor lift conduit 11 and is conveyed from chamber S to the upper portion of the absorber A by means of conduit 18. The absorption liquid flows downwardly through the inclined tubular absorber in counterflow to the gas vapor mixture and is returned to the boiler through the conduit 19 which is in heat exchange relation with the weak liquor conduit 18.

The boiler B is heated in any suitable manner as by a gas flame or an electrical heater. The inert gas circulating fan motor G is connected to a source of electricity in any suitable manner.

The general arrangement of the absorber A is illustrated in Figure 1. The absorber A comprises a continuous reversely bent conduit 21 preferably formed by welding return bends to a series of straight conduits and is continuously inclined from its upper to its lower end. The pipe 21 need not be vertically positioned as illustrated, for purpose of convenience, in Figure 1; it may be positioned in any plane from the vertical to one slightly inclined from the horizontal. The pipe 21 is designed to be cooled by natural conduction currents induced in the surrounding atmosphere.

Referring now to Figures 2, 3, and 4 the absorber will be described in detail. In order to cool the absorber the exterior surface thereof, except at the return bends, is covered with heat conducting fins 22 which are provided with integral collars 23 snugly engaging the pipe 21. The fins and collars 22—23 are preferably made of light sheet metal material and have a high heat conductivity. The collars 23 should be mounted to have good thermal contact with pipe 21; this can be accomplished by welding, brazing, tinning, or by forcing the collars 23 onto the pipe 21.

Interiorly the absorber pipe 21 is provided with a plurality of spaced baffle members 24 and 25.

Each baffle member 24 is constructed from a cup of thin sheet material preferably having a high heat conductivity. The bottom of the cup is dished and then cut out along two parallel chords leaving two spaced segments 27 and 28 in the cup bottom. The segment 28 is detached from the cylindrical portion 29 of the cup 24 except at its top central portion and is then bent outwardly.

The baffle members 25 are also formed from cup members made of light weight sheet material preferably having a high heat conductivity. The bottom of each baffle member 25 is cut out along two parallel chords to form a pair of spaced segments 30 and 31. The cut out portions of the baffles 25 are narrower than the cut out portions of the baffles 24. The lower segment 30 of each baffle 25 is normal to the cylindrical portion 32 of the baffle and is provided with a small opening 33 at its central portion adjacent the cylindrical portion 32. The upper segment 31 of each baffle 25 is cut and bent outwardly in the same manner in which the segment 28 is cut and bent.

If desired the segments 28 and 31 may be bowed outwardly like segments 27 without being cut away from the cylindrical portions 29 and 32, respectively. This structure provides better heat transfer between the gas stream and the fins 22 but it also results in a sharper angle of gas and liquid contact.

The baffle cups 24 and 25 are assembled in spaced relation in the absorber pipe 21. The baffles are placed in the pipe 21 with the segments 28 and 31 pointing upstream with respect to the direction of flow of the absorption liquid as indicated in Figure 2. The baffles are arranged in pairs; that is, one baffle 25 is placed with its cylindrical portion 32 in abutting relation with the end of an associated baffle 24 having segments 27 and 28 and upstream with respect thereto. The segments 27 and 30 are placed in the bottom portion of the absorber pipe 21. The baffle pairs are spaced a substantial distance apart in the absorber pipe 21 whereby they form spaced pools of absorption liquid indicated at 34. The baffles are so placed with respect to the inclination of the pipe 21 and the height of the segments 27 that the foot portion of each liquid pool 34 barely covers the lowermost portion of the next upstream segment 27.

The baffles 24 and 25 are forced into the pipe 21 whereby the cylindrical portions 29 and 32, respectively, have good thermal contact with the interior wall of the absorber pipe 21. The baffles 24 and 25 may be welded, brazed, tinned, pressed, or secured in any other suitable manner to the inner wall of the pipe 21.

In operation weak absorption liquor is supplied to the upper end of the absorber through the conduit 18 and trickles down through the absorber pipe 21 forming a plurality of spaced pools of liquid indicated at 34. It will be seen from Figure 2 that the liquid contained in the pools 34 cannot spill over the segments 30 of the baffles 25; therefore the liquid must pass through the openings 33, which are assembled adjacent the lowermost portion of the absorber pipe, in order to pass over the segments 27 into the next lower liquid pool. This is very advantageous since there is a tendency for stratification to occur in the liquid pools with the result that the weak liquid, being lighter in weight than the strong liquid, settles to the bottom of the pool and does not take an active part in the absorption process. Due to the arrangement herein disclosed the weak liquid is brought from the bottom of the pool up through the surface of the small pool between adjacent baffles 24 and 25 and is then discharged down the inclined surface of the segment 27 into the foot portion of the next lower liquid pool 34. This action agitates the entire pool 34, prevents stratification, and mixes the liquids of various concentrations therein contained. The liquid travelling down the inclined face of segment 27 is struck and wiped by the gas stream and thus produces efficient gas liquid contact and absorption. The segments 28 and 31 introduce turbulent condition into the gas stream and cause the same to have good wiping contact with the interior walls of the pipe 21 to thereby transmit the heat of absorption through the walls 21 to the fins 22. The segments 28 and 31 also direct the gas stream against the surfaces of the liquid pools and thereby agitate the pools to prevent stratification therein. Due to the fact that the segments 28 and 31 are positioned adjacent the segments 27 and 30, respectively, and also adjacent the deepest portion of the liquid pools, the gas passing by the segments 28 and 31 possesses a relatively high velocity and aids in promoting efficient agitation and stirring of the liquid in the pools 34.

While I have illustrated and described several embodiments of my invention, it is to be understood that these are to be taken as illustrative only and not in a limiting sense. I do not wish to be limited to the precise structure shown but to include all equivalent variations thereof except as limited by the scope of the appended claims.

I claim:

1. An absorber adapted for use in an absorption refrigerating system using inert gas, which comprises an inclined vessel and baffle elements in said vessel adapted to cause the formation of liquid pools along the lower side of said vessel, said baffle elements having means thereon for causing gases supplied to said vessel to pass therethrough turbulently and to be forcibly directed onto the surface of each liquid pool adjacent one end thereof at a plurality of points, the means which causes the gases to strike the surfaces of said liquid pools comprising downwardly directed vanes formed on said baffle elements.

2. An absorber adapted for use in an absorption refrigerating system using inert gas, which comprises an inclined vessel and baffle elements in said vessel to cause the formation of liquid pools along the lower side of said vessel, said baffle elements having means thereon for causing gases supplied to said vessel to pass therethrough turbulently and to be forcibly directed onto the surface of each liquid pool adjacent one end thereof at a plurality of points and alternate baffles having openings in the lower portions thereof.

3. An absorber comprising an inclined conduit, means for supplying absorption liquid to the upper end of the conduit and for removing liquid from the lower end thereof, a plurality of spaced pairs of baffles in said conduit adapted to form pools of absorption liquid, the distance between the baffles of each pair being less than the distance between the pairs, the up-stream baffle of each pair being constructed to force the liquid at the bottoms of the liquid pools to pass upwardly into the space between the pairs of baffles, and gas guiding and directing vanes on each of said baffles.

4. In an absorption refrigerating system the combination of an inclined conduit, means for supplying absorption liquid to the upper portion and for removing liquid from the lower portion thereof, a plurality of spaced pairs of baffles in said conduits adapted to form liquid pools, the arrangement being such that the liquid pools are separated into unequal parts by one of the baffles of each pair, said separating baffles being constructed to cause the liquid in the bottom of the larger portions of the pools to pass to the surface of the smaller portions of the liquid pools, and means on each of said baffles for directing gas downwardly at a sharp angle against the liquid pools formed thereby.

5. An absorber adapted for use in an absorption refrigerating system comprising an inclined vessel, a plurality of spaced pairs of pool forming and gas guiding baffles in said conduit, one baffle of each pair being formed from a cup element having its bottom portion cut out to form a pair of facing segments, one segment being bowed and inclined outwardly from the wall of said cup element and the other segment being struck outwardly from the plane of the bottom of the cup element, the other baffle of each pair being formed from a cup element having a portion of its bottom cut out to form a pair of oppositely facing segments, one of said last mentioned segments being provided with an opening and the other of said last mentioned segments being struck outwardly from the plane of said cup element bottom.

6. In an absorption refrigerating system the combination of an inclined conduit, means for supplying absorption solution to the upper portion and for removing absorption solution from the lower portion of said conduit, means for propelling a mixture of pressure equalizing medium and refrigerant to be absorbed upwardly through said conduit, a plurality of spaced pairs of baffles in said conduit, the downstream baffle of each pair including a pool forming weir inclined counter to the direction of liquid flow and a downwardly directed gas guiding vane, the upstream baffle of each pair including an orifice adjacent the bottom portion of said conduit and a downwardly directed gas guiding vane and a plurality of heat rejecting fins on the exterior wall of said conduit.

7. Absorption refrigerating apparatus comprising an inclined tubular absorber conduit, a plurality of heat rejecting fins mounted on the exterior wall of said conduit, means for supplying absorption solution to the upper end of said conduit and for removing enriched absorption solution from the lower end thereof, means for circulating a mixture of inert gas and refrigerant vapor to be absorbed upwardly through said conduit, means mounted within said inclined conduit for forming pools of the absorption solution along the bottom of said conduit and for directing solution from the deepest end of each of said pools to the shallowest ends of the subjacent pools, said last-mentioned means including means for inducing turbulent flow conditions in the gas stream above the surfaces of said pools.

8. Absorption refrigerating apparatus comprising an elongated tubular absorber conduit, air cooling fins carried on the exterior wall of said conduit, means for supplying lean absorbing solution to one portion of said conduit and for removing enriched absorbing solution from another portion thereof, means for supplying a mixture of refrigerant vapor to be absorbed and inert gas to said conduit, and liquid pool forming and gas flow obstructing means frictionally engaged with the inner wall of said conduit, said last-mentioned means including a plurality of liquid pool forming portions along the lower portion of the interior of said conduit, portions formed to direct liquid at the bottom portion of each of said pools adjacent its associated pool forming portion into the portion of an adjacent pool remote from its associated pool forming portion, and portions above the surface of each of said pools projecting inwardly of the inner wall of said conduit into the gas containing portion thereof to produce turbulent conditions in the refrigerant vapor inert gas stream.

9. Absorption refrigerating apparatus comprising an elongated tubular absorber conduit, means for supplying lean absorbing solution to one portion of said conduit and for removing enriched absorbing solution from another portion thereof, means for supplying a mixture of refrigerant vapor to be absorbed and inert gas to said conduit, liquid pool forming and gas flow obstructing means frictionally engaged with the inner wall of said conduit, said last-mentioned means including a plurality of liquid pool forming portions along the lower portion of the interior of said conduit, portions formed to direct liquid at the bottom portion of each of said pools adjacent its associated pool forming portion into the portion of an adjacent pool remote from its associated pool forming portion and portions above the surface of each of said pools projecting inwardly of the inner wall of said conduit into the gas containing portion thereof to direct the refrigerant vapor inert gas mixture against the surfaces of the pools at a sharp angle and generally counter to the direction of liquid flow, and means for abstracting heat from the bottom portions of said pools and for abstracting heat from all portions of the gas stream in contact with the inner wall of said conduit.

10. An absorber for absorption refrigerating machines comprising an inclined tubular conduit, means for supplying an absorbing solution to the upper end of said conduit, means for supplying a stream of refrigerant vapor and pressure equalizing medium to the lower end of said conduit, means for air cooling said conduit, and baffling means within said conduit for forming pools of the absorbing solution, said baffling means including means for removing solution from the deepest portion of each pool and for flowing the same into the shallow portion of the adjacent lower pool and means for forcing the pressure equalizing medium and refrigerant vapor to strike the deepest end of each pool at a sharp angle and to produce a non-straight flow thereof through said conduit to improve the contact between the pressure equalizing medium refrigerant vapor stream, the solution and the walls of the conduit.

WILLIAM H. KITTO.